United States Patent
Lee et al.

(10) Patent No.: US 7,602,332 B1
(45) Date of Patent: Oct. 13, 2009

(54) REDUCING SCATTERING CENTER DATA USING MULTI-VOLUME AGGREGATION

(75) Inventors: Chul J. Lee, Lexington, MA (US);
Brian J. Harkins, Westford, MA (US);
Andrew P. Simmons, Andover, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/138,814

(22) Filed: Jun. 13, 2008

(51) Int. Cl.
*G01S 7/40* (2006.01)
*G01S 13/00* (2006.01)
*G06T 15/30* (2006.01)
*G06T 17/20* (2006.01)
*G06T 15/40* (2006.01)
*H03F 1/26* (2006.01)
*G06F 17/00* (2006.01)

(52) U.S. Cl. ............... 342/169; 342/175; 345/421; 345/423; 345/426; 707/101; 702/189

(58) Field of Classification Search ............... 342/169, 342/175, 195, 197; 345/421, 423, 426; 707/100, 707/101; 702/189
See application file for complete search history.

(56) References Cited

U.S. PATENT DOCUMENTS

| | | | |
|---|---|---|---|
| 4,123,165 A | 10/1978 | Brown et al. | |
| 4,373,808 A | 2/1983 | Pell et al. | |
| 5,086,396 A | 2/1992 | Waruszewski, Jr. | |
| 5,096,281 A | 3/1992 | Windebank et al. | |
| H1181 H * | 5/1993 | Rihaczek | 342/25 F |
| 5,227,801 A | 7/1993 | Pierce | |
| 5,305,430 A | 4/1994 | Glassner | |
| 5,317,689 A | 5/1994 | Nack et al. | |
| 5,355,442 A | 10/1994 | Paglieroni et al. | |
| 5,392,050 A | 2/1995 | Guerci et al. | |
| 5,583,975 A | 12/1996 | Naka et al. | |
| 5,588,032 A * | 12/1996 | Johnson et al. | 378/8 |
| 5,594,844 A * | 1/1997 | Sakai et al. | 345/427 |
| 5,616,031 A | 4/1997 | Logg | |

(Continued)

OTHER PUBLICATIONS 3D scattering center extraction from Xpatch, Bhalla, R. Hao Ling , Dept. of Electr. & Comput. Eng., Texas Univ., Austin, TX; Antennas and Propagation Society International Symposium, 1995. AP-S. Digest, Jun. 18-23, 1995, vol. 4, on pp. 1906-1909 vol. 4, Jun. 18-23, 1995.*

(Continued)

*Primary Examiner*—Thomas H Tarcza
*Assistant Examiner*—Peter M Bythrow
(74) *Attorney, Agent, or Firm*—Daly, Crowley, Mofford & Durkee, LLP

(57) ABSTRACT

In one example, a method to reduce scattering centers (SC) includes receiving a set of SC data points associated with an object in three-dimensional space, partitioning the SC data points into a plurality of volumes, aggregating the SC data points within each volume based on an aggregate threshold and combining the aggregated SC data points associated with each volume to form a reduced set of SC data points. The method also includes comparing the reduced set of SC data points with the received set of SC data points to determine if the reduced set of SC data points meets a set of comparison metrics and if the reduced set of SC data points meets the set of comparison metrics, increasing the size of the volumes and performing another iteration of reducing the SC data points by volume.

20 Claims, 7 Drawing Sheets

U.S. PATENT DOCUMENTS

| | | | |
|---|---|---|---|
| 5,933,146 | A | 8/1999 | Wrigley |
| 5,953,722 | A * | 9/1999 | Lampert et al. ............. 707/100 |
| 6,005,916 | A * | 12/1999 | Johnson et al. .............. 378/87 |
| 6,031,542 | A | 2/2000 | Wittig |
| 6,212,132 | B1 | 4/2001 | Yamane et al. |
| 6,750,805 | B1 | 6/2004 | Cameron |
| 6,750,859 | B2 * | 6/2004 | Sowizral et al. ............. 345/418 |
| 6,924,763 | B2 | 8/2005 | Poullin |
| 6,941,303 | B2 | 9/2005 | Perrizo |
| 7,123,548 | B1 | 10/2006 | Uzes |
| 7,289,118 | B2 | 10/2007 | Schmittler et al. |
| 7,348,975 | B2 * | 3/2008 | Reshetov et al. ............ 345/421 |
| 7,535,408 | B2 | 5/2009 | Kuhn |
| 2002/0060784 | A1 | 5/2002 | Pack et al. |
| 2002/0075260 | A1 * | 6/2002 | Brokenshire et al. ........ 345/420 |
| 2002/0087858 | A1 | 7/2002 | Oliver et al. |
| 2003/0011519 | A1 | 1/2003 | Breglia et al. |
| 2003/0022395 | A1 | 1/2003 | Olds |
| 2005/0138073 | A1 | 6/2005 | Zhou et al. |
| 2008/0132174 | A1 | 6/2008 | Corral et al. |
| 2009/0040096 | A1 | 2/2009 | Lee et al. |
| 2009/0040098 | A1 | 2/2009 | Lee et al. |

OTHER PUBLICATIONS

Antenna Handbook, vol. I Fundamentals and Mathematical Techniques; P.H. Pathak, Ohio State University ElectroScience Laboratory; Edited by Y.T. Lo and S.W. Lee; Chapter 4, pp. 4-1-4-110, Van Nostrand Reinhold, New York, 1993.

Notification of Transmittal of the International Search Report and the Written Opinion of the International Searching Authority, or the Declaration, PCT/US2008/072434 dated Feb. 6, 2009.

Walker et al., "Parallel Computation of Time-Domain Integral Equation Analyses of Electromagnetic Scattering and RCE", IEEE Transactions on Antennas and Propagation, IEEE Service Center, Piscataway, NJ, vol. 45., No. 4, Apr. 1, 1997, XP011002960, ISSN: 0018-926X, pp. 614-619.

Ngoly et al., "Parallel Post-Processing Techniques for Fast Radar Cross-Section Computation", 2006 $12^{th}$ Biennial IEEE Conf. on Electromagnetic Field Computation, Apr. 30, 2006, p. 377.

Jin-Lin Hu et al, "RCS Computation of Jet Engine with Complex Termination Based on Multiplaten Z-buffer Algorithm", Microwave Conf., 1999 Asia Pacific Singapore, Nov. 30-Dec. 3, 1999, Picscataway, NJ, USA, IEEE, Nov. 30, 1999, XP010374299, ISBN: 978-0-7803-5761-7, pp. 781-784.

Ling, H.; Chou, R.-C.; Lee, S.-W.; Shooting and bouncing rays: calculating the RCS of an Arbitrarily Shaped Cavity, Feb. 1989; Antennas and Propagation, IEEE Transactions on vol. 37, Issue 2, pp. 2: 194-205.

File downloaded from PAIR for U.S. Appl. No. 11/889,197, filed Aug. 9, 2007, file through Jun. 15, 2009, 67 pages.

File downloaded from PAIR for U.S. Appl. No. 11/889,198, filed Aug. 9, 2007, file through Jun. 15, 2009, 66 pages.

Real-time radar cross section of complex targets by physical optics graphical processing; Rius, J.M.; Ferrando, M.; Antennas and Propagation Society International Symposium, 1990, AP-S. Merging Technologies for the 90's. Digest. May 7-11, 1990 pp. 1280-1283 vol. 3.

Xpatch 4: the next generation in high frequency electromagnetic modeling and simulation software; Andersh, D.; Moore, J.; Kosanovich, S.; Kapp, D.; Bhalla, R.; Kipp, R.; Courtney, T.: Nolan, A.; German, F.; Cook, J.; Hughes, J.; Radar Conference, 2000. The Record of the IEEE 2000 International.

Ufimtsev, P. Ya., "Diffraction of Plane Electromagnetic Waves By A Thin Cylindrical Conductor", Radio Eng. Electron Phys., vol. 7, pp. 241-249, 1962.

Pathak et al., "Model, Ray, and Beam Techniques for Analyzing the EM Scattering by Open-Ended Waveguide Cavities", IEEE Transaction on Antennas and Propagation, vol. 37, No. 5, May 1989, pp. 635-647.

Pathak et al., "An Efficient Hybrid FE-BI-TW-Collective Ray Formulation for Analysis of Large Conformal Arrays", 2008 Union Radio Scientifique Internationale—(URSI) General Assembly, Aug. 7-16, 2008, 4 pages.

Oguzer et al., "On the Elimination of Infinities in the PO Component of Equivalent Edge Currents", Wave Motion, vol. 18, pp. 1-10, 1993.

Prabhakar H. Pathak, "High-Frequency Techniques for Antenna Analysis", Proceedings of the IEEE, vol. 80, No. 1, Jan. 1992, pp. 44-65.

Book, Edited by Andrew S. Glassner, "An Introduction to Ray Tracing", U.S. Edition Published by Academic Press, 1989, 329 pages.

Steve Kosanovich, "Fundamentals of Xpatch", Training Class Manual, SAIC DEMACO, Apr. 28, 2008.

Notification of Transmittal of the International Search Report and the Written Opinion of the International Searching Authority, or the Declaration, PCT/US2008/072433 dated Feb. 24, 2009.

Lozano L et al: "Improvements in Ray-Tracing Acceleration Techniques to Compute Diffraction Effect and Doubles and triples Effects in the RCS Prediction of Complex Targets", Antennas and Propagation Society Symposium, 2005. IEEE Washington, DC, Jul. 3-8, 2005, Piscataway, NJ: IEEE, US, vol. 3A, Jul. 3, 2005, pp. 93-96, XP010859931, ISBN: 978-0-7803-8883-3, the whole document.

Schmitz J L et al: "Zpatch. A high frequency bistatic signature prediction code", Radar Conference, 1997, IEEE National Syracuse, NY, USA May 13-15, 1997, New York, NY, USA, IEEE, US, May 13, 1997, pp. 232-236, XP010224774, ISBN: 978-0-7803-3731-2, the whole document.

Yu C L et al: "Radar cross section computation and visualization by shooting-and-bouncing ray (SBR) technique", Proceedings of the antennas and Propagation Society International Symposium (APSIS). Chicago, Jul. 20-24, 1992; [Proceedings of the Antennas and Propagation Society International Symposium (APSIS)], New York, IEEE, US, vol. -, Jul. 18, 1992, pp. 1323-1326, XP010065787, ISBN: 978-0-7803-0730-8, the whole document.

Savides T et al: "Radar simulation using the shooting and bouncing ray technique" CCECE 2003. Canadian Conference on Electrical and Computer Engineering, Montreal, Canada, May 4-7, 2003; [Canadian Conference on Electrical and Computer Engineering], New York, NY, IEEE, US, vol. 1, May 4, 2003, pp. 307-310, XP010653888, ISBN: 978-0-7803-7781-3, the whole document.

Ozturk A K: "Implementation of Physical Theory of Diffraction for Radar Cross Section Calculations", The Institute of Engineering and Sciences of Bilkent University, in Partial Fulfillment of the Requirements for the Degree of Master of Science, Jul. 2002, 72 pages.

Shore R A, Yaghjian A D: "Application of incremental length diffraction coefficients to calculate the pattern effects of the rim and surface cracks of a reflector antenna", Antennas and Propagation Society International Symposium, 1993, AP-S Digest, pp. 1350-1353.

C. Ozdemir, R. Bhalla, H. Ling, "Fast ASAR Imag Formation Using the Shooting and Bouncing Ray Technique", IEEE Antennas and Propagation Society International Symposium, vol. 4, pp. 2605-2608, Jul. 13-18, 1997.

T.B. Hansen, "Corner Diffraction Coefficients for the Quarter Plate", IEEE transactions on Antennas Propagation, vol. 39, No. 7, pp. 976-984, Jul. 1991.

R.A. Shore, A.D. Yaghjian, "Application of Incremental Length Diffraction Coefficients to Calculate the Pattern Effects of the Rim and Surface Cracks of a Reflector Antenna", IEEE Antennas and Propagation Society International Symposium, 1993.

Havran V: "Heuristic Ray Shooting Algorithms", PhD thesis, Czech Technical University in Prague, Nov. 2000, 220 pages.

* cited by examiner

Ｕ S 7,602,332 B1

REDUCING SCATTERING CENTER DATA USING MULTI-VOLUME AGGREGATION

GOVERNMENT SPONSORED RESEARCH

This invention was made with Government under Contract HQ0006-03-C-0047 awarded by the Missile Defense Agency. The United States Government has certain rights in the invention.

BACKGROUND

A radar system emits radio waves that are reflected by an object (also referred to as a target) in a form of a reflect signal that is detected by the radar system. In general, the reflected signal includes a component associated with a direct reflection from the object (sometimes called a single bounce (SB)) and a component from indirect reflections from the object (e.g., reflections off of other objects in space such as ground, buildings and so forth) (sometimes called a multiple bounce (MB)). Based on the intensity and angle of the reflected signal, the location of the object may be determined.

In training scenarios, instead of using actual objects, it is more practical and cost effective to use simulated radar objects. The simulated radar objects may be generated using radar signature modeling tools that emulate the radar object. For example, radar signature modeling tools are used to generate radar signature models to emulate a variety of objects that include, for example, ballistic missiles, airplanes, other 3-Dimensional (3-D) objects and so forth. One such radar signature modeling tool is XPATCH®.

SUMMARY

In one example, a method to reduce scattering centers (SC) includes receiving a set of SC data points associated with an object in three-dimensional space, partitioning the SC data points into a plurality of volumes, aggregating the SC data points within each volume based on an aggregate threshold and combining the aggregated SC data points associated with each volume to form a reduced set of SC data points. The method also includes comparing the reduced set of SC data points with the received set of SC data points to determine if the reduced set of SC data points meets a set of comparison metrics and if the reduced set of SC data points meets the set of comparison metrics, increasing the size of the volumes and performing another iteration of reducing the SC data points by volume.

In another aspect, an article includes a machine-readable medium that stores executable instructions to reduce scattering centers (SC). The instructions cause a machine to receive a set of SC data points associated with an object in three-dimensional space, partition the SC data points into a plurality of volumes, aggregate the SC data points within each volume based on an aggregate threshold and combine the aggregated SC data points associated with each volume to form a reduced set of SC data points. The instructions also cause a machine to compare the reduced set of SC data points with the received set of SC data points to determine if the reduced set of SC data points meets a set of comparison metrics and if the reduced set of SC data points meets the set of comparison metrics, increase the size of the volumes and performing another iteration of reducing the SC data points by volume.

In a further aspect, an apparatus includes circuitry to receive a set of SC data points associated with an object in three-dimensional space, partition the SC data points into a plurality of volumes, aggregate the SC data points within each volume based on an aggregate threshold and combine the aggregated SC data points associated with each volume to form a reduced set of SC data points. The apparatus further includes circuitry to compare the reduced set of SC data points with the received set of SC data points to determine if the reduced set of SC data points meets a set of comparison metrics and if the reduced set of SC data points meets the set of comparison metrics, increase the size of the volumes and performing another iteration of reducing the SC data points by volume.

In a still further aspect, a method to reduce scattering centers (SC) includes receiving from a radar signature modeling tool a set of SC data points associated with an object in three-dimensional space, partitioning the SC data points into a plurality of volumes, aggregating the SC data points within each volume based on an aggregate threshold and combining the aggregated SC data points associated with each volume to form a reduced set of SC data points. The method also includes comparing the reduced set of SC data points with the received set of SC data points to determine if the reduced set of data points meets a set of comparison metrics based on a set of comparison metrics including a similarity metric, a maximum amplitude metric, a length metric and a relative maximum amplitude metric. The method further includes if the reduced set of SC data points meets the set of comparison metrics, increasing the size of the volumes and performing another iteration of reducing the SC data points by volume.

DETAILED DESCRIPTION

Prior attempts to reduce scattering centers (SC) for objects generated from 3D Inverse Synthetic Aperture Radar (ISAR) imageries were based on the magnitude of the SC data points for an entire object. For example, the SC data points having the stronger intensity (e.g., having the stronger radar cross section (RCS) value) were kept while the weaker intensity SC data points were discarded. As a consequence, often key features such as delay returns and/or low amplitude base returns were excluded from the SC data and thus the complexity of the object was lost. For example, after performing these prior art techniques, a missile did not appear like a missile after a SC data reduction. Moreover, current and near-future real-time radar return injection systems used in simulation do not have the processing capability to support a large number of SC data points generated by the radar signature modeling tools (e.g., XPATCH®). For example, to emulate an object, the radar signature modeling tools generated thousands of SC data points while the radar return injection systems can only effectively process a few hundred SC data points per object. Described herein are techniques to reduce the number of SC data points for an object provided by the radar signature modeling tools by roughly an order of magnitude smaller for use in current simulation applications while retaining the radar signature complexity of the object.

Figure 1:
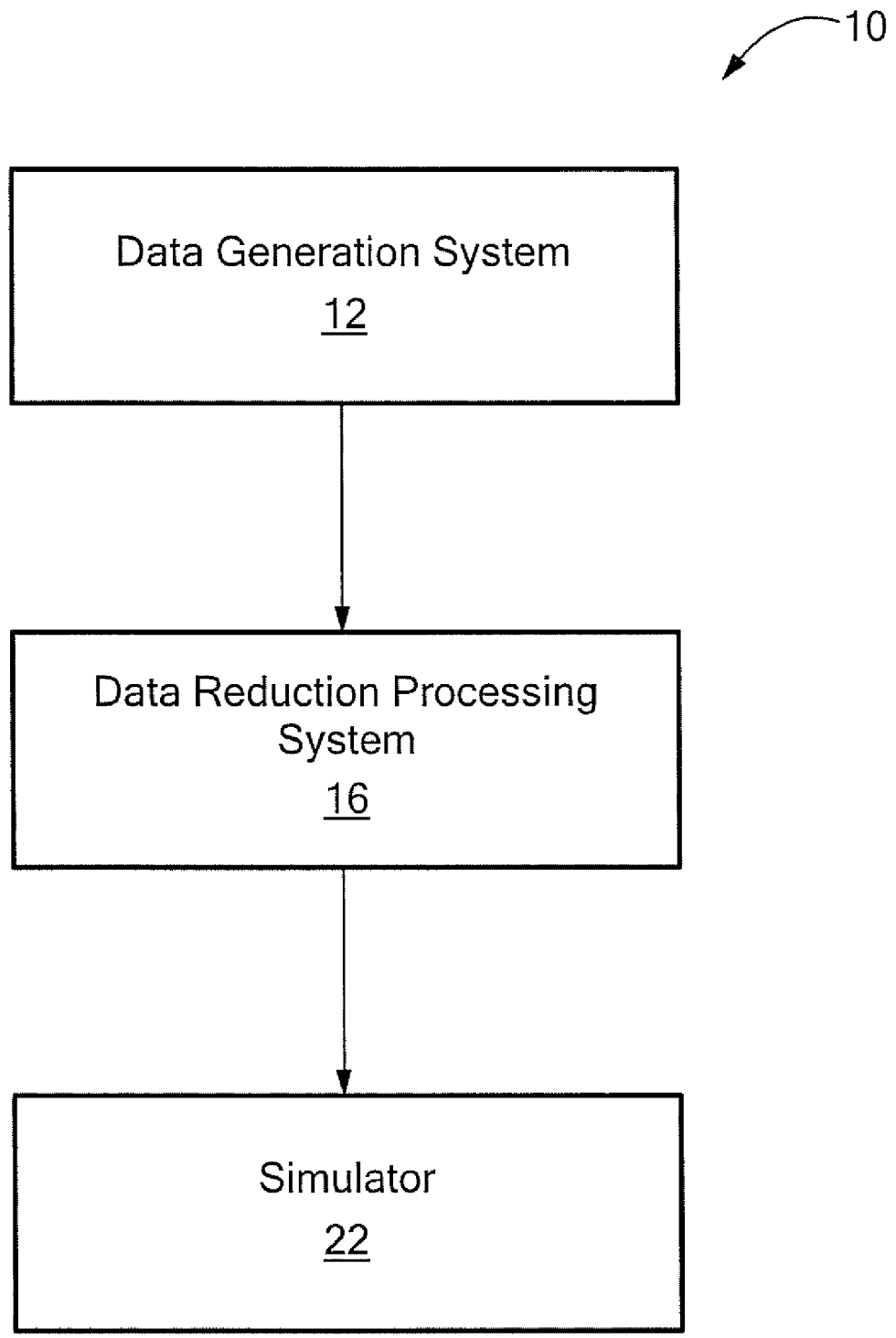
FIG. 1 is a diagram of a radar simulation system.

Referring to FIG. 1, a simulator system 10 includes a data generation system 12 such as a radar signature modeling tool, for example, a data reduction processing system 16 and a simulator 22. The data generation system 12 provides an original SC data set that includes a radar object that is being emulated. The data reduction processing system 16 reduces the original SC data set provided by the data generation system 12 and provides a reduced SC data set to the simulator 22 for radar simulations. In one example, the data reduction processing system 16 provides SC data to the simulator 12 that is a non-tactical simulator which does not perform real-time processing of the SC data. In another example, the data reduction processing system 16 further reduces the SC data to provide SC data to the simulator 12 that is a tactical simulator which does perform real-time processing of the data.

The data reduction processing system 16 partitions the SC data into multiple volumes associated with a three-dimension space. For example, the 3-D space is represented by cubes. Within each volume, the data reduction processing system 16 aggregates the SC data from hundreds of SC data points, for example, down to an aggregate threshold.

One of ordinary skill in the art recognizes that there may be a number of different aggregation algorithms that may used to aggregate the SC data points in a volume. In one example, an aggregated SC data point (or points) may be determined through coherent integration of the SC data points in a volume. The coherent integration includes identifying a peak location (e.g., a location in the volume having the highest RCS value) among the SC data points in the volume. The coherent integration also includes converting a value of each SC data point in a spatial domain to a value in a frequency domain, adding all values for all frequencies and converting the values into spatial domain, and determining a peak value (e.g., the highest RCS value). Thus, an aggregated SC data point will be a complex value (from the peak value) located at the peak location.

For each volume, the data reduction processing system 16 compares the aggregated SC points to the original SC data points for the respective volume using a set of metrics to ensure that the aggregated data is representative of the complexity for that volume. For example, if the volume does not meet the criteria for that volume, then the aggregate threshold is increased again for that volume. The aggregate threshold is increased iteratively until the volume may be represented by SC data points that meet the criteria.

By aggregating the SC data of the object into multiple volumes, the process ensures that the SC data from all areas in space will be represented after the aggregation and not just those areas in space having SC data with relatively higher intensity values (e.g. higher RCS values) than those of other areas.

After the aggregated SC data for each volume has been determined, the data reduction processing system 16 sums the aggregated SC data to form a set of reduced SC data points. The reduced SC data set is compared to the original SC data set received.

Since a goal of reducing the number of SC data points is to maintain the complexity of the original SC data in the reduced SC data, the reduced SC data is compared against the original SC data at every reduction using another set of comparison metrics. If the differences between the original SC data and the reduced SC data are not outside pre-defined bounds defined by a set of comparison metrics, then the reduction process is executed again with size of the volume increases proportionately. The aggregation and reduction cycle is repeated until a reduced SC data set that meets the comparison metrics is generated.

Figure 2:
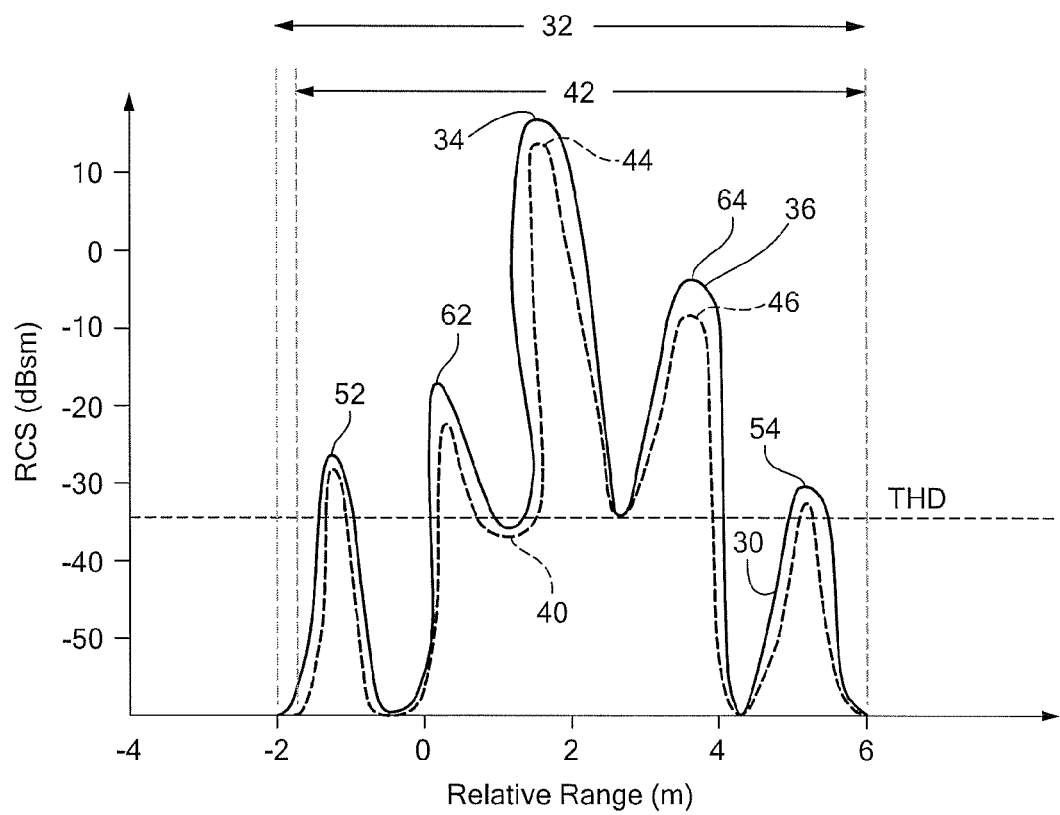
FIG. 2 is a graph depicting features used in comparing original scattering center (SC) data with reduced SC data.

Referring to FIG. 2, in one example, the comparison metrics evaluate features of a radar return range profile from the reduced SC data compared to a radar return range profile from the original SC data. In particular, FIG. 2 illustrates representative wide-band (WB) range profiles (RCS values vs. relative range) for an original SC data set 30 and for a reduced SC data set 40.

In one example, the comparison metrics include a similarity metric, a length metric, a maximum amplitude metric and a relative maximum amplitude metric. The original SC data is compared to the reduced SC data for all SC data above a threshold intensity value to avoid corruption by secondary data.

The similarity metric is used to determine an acceptable similarity between the original SC data set and the reduced SC data set. The similarity is equal to $$1 - \frac{|\sum A_{ref}(>THD) - \sum A(>THD)|}{\sum A_{ref}(>THD) + \sum A(>THD)},$$

where A is the area (e.g., in meters squared) of the wide band profile of the reduced SC data, $A_{ref}$ is the area (e.g., in meters squared) of the wide band profile of the original SC data and THD is the threshold intensity value used to avoid corruption by secondary data. Similarity values range from 0 to 1 where 1 is the most similar. In one example, a similarity metric indicates that a similarity value above 0.6 is acceptable for object complexity.

The length metric is used to determine an acceptable length of the object in the reduced SC data. For example, in FIG. 2, a length is the length of the object that corresponds to the length of the pulse along the relative range axis. A length 32 corresponds to a length in the original SC data set and a length 42 corresponds to a length in the reduced SC data set. In one example, a length metric indicates that if the length 42 of the object in the profile for the reduced SC data set is within 80% of the length 32 of the object in the profile for the original SC data, then the length 42 is acceptable for object complexity. In another example, the length metric indicates that the difference in length between the length 42 and the length 32 is no greater than a predetermined length is acceptable for object complexity (e.g., if the object is a missile, if the difference between the length 42 and the length 32 is 0.5 meters, for example).

The maximum amplitude metric is used to determine an acceptable maximum amplitude (maximum peak) in the reduced SC data. The maximum amplitude is the highest magnitude intensity of the WB pulse. For example, a maximum amplitude 34 is the highest magnitude of intensity (e.g., RCS value) for the original SC data set and a maximum amplitude 44 is the highest magnitude of intensity (e.g., RCS value) for the reduced SC data set. In one example, a maximum amplitude metric indicates that if the maximum amplitude 44 of the object in the profile for the reduced SC data set is within 2 dB of the maximum amplitude 34 of the object in the profile for the original SC data, then the maximum amplitude 34 is acceptable for object complexity.

The relative maximum amplitude metric is used to determine an acceptable relative maximum amplitude (relative maximum peak) in the reduced SC data. For example, in FIG. 2, an example of a relative maximum amplitude 34 is the highest magnitude of intensity (RCS) for the original SC data set and a maximum amplitude 44 is the highest magnitude of intensity (RCS) for the reduced SC data set. In one example, a relative maximum amplitude metric indicates that if the relative maximum amplitude 46 of the object in the profile for the reduced SC data set is within 2 dB of the maximum amplitude 36 of the object in the profile for the original SC data, then the relative maximum amplitude 34 is acceptable for object complexity.

In one example, the relative maximum amplitude metric comparison is performed at a first peak 52. In another example, the relative maximum amplitude metric comparison is performed at a last peak 54. In other examples, more than one relative maximum amplitude metric comparison may be performed for multiple relative maximum amplitudes (e.g., using any combination of the first peak 52, the last peak 54, and intermediary peaks (e.g. a peak 62 and a peak 64)).

While FIG. 2 is directed to determining the complexity of the reduced SC data with the original SC data, the same techniques may be used to determine if a volume conforms to another set of metrics. For example, for each volume, a set of metrics may include a similarity metric, a length metric and a maximum amplitude metric.

Figure 3A:
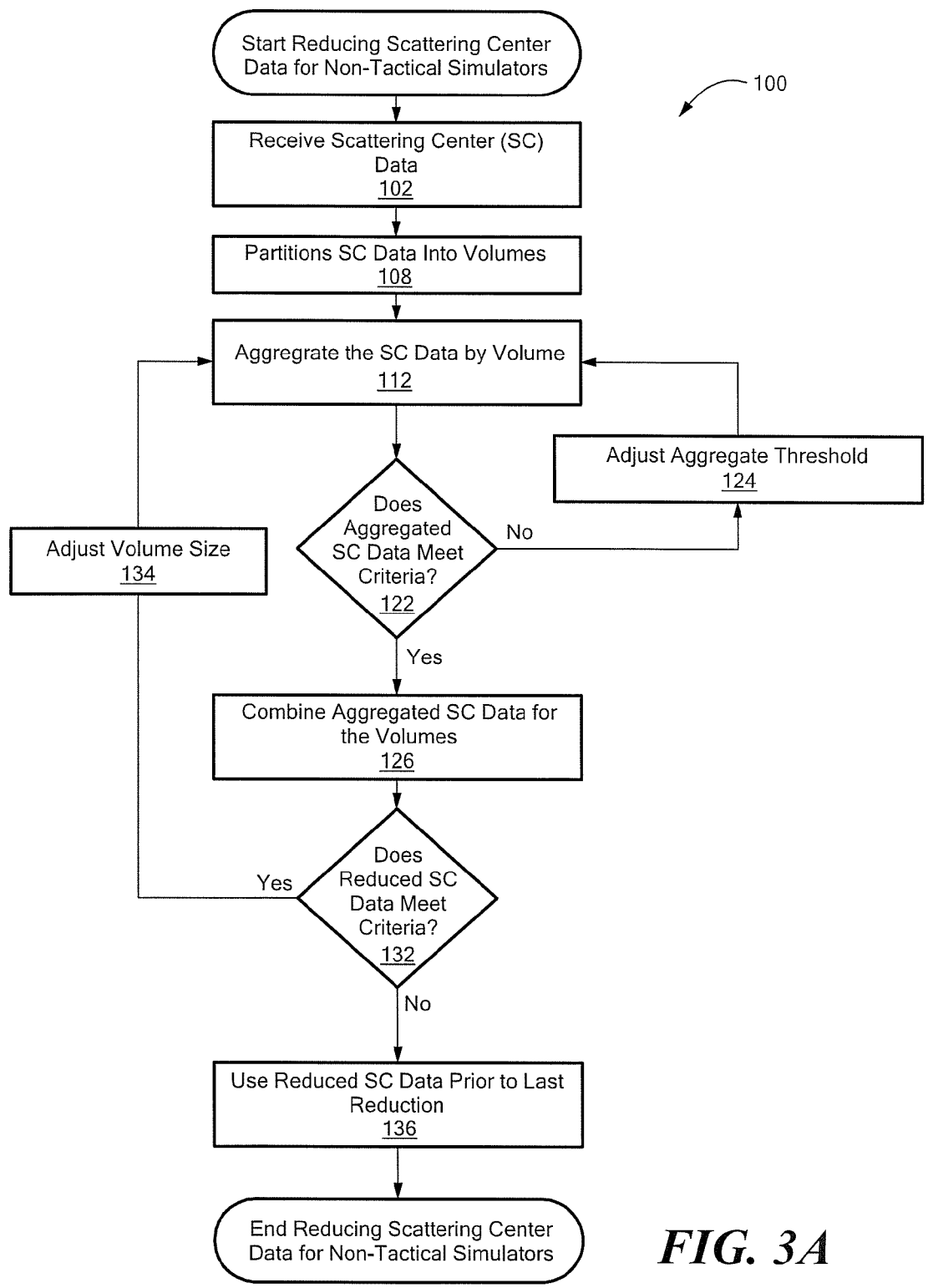
FIGS. 3A and 3B are flow charts of a process to reduce SC data.

Referring to FIG. 3A, in one example, a process to reduce SC data for uses by simulator 22 that is a non-tactical simulator is a process 100. The data reduction processing system 16 receives SC data associated with an object from the data generation system 12 (102). The data reduction processing system 16 partitions the SC data into multiple volumes (108). For example, the SC data for the object is partitioned into cube volumes. For each volume, the data reduction processing system 16 aggregated the SC data (112). For example, the hundreds of SC data point in a volume may be reduced to 0, 1, 2 or 3 SC points for each column. For each volume, the data reduction processing system 16 determines whether the aggregation conform to the comparison metrics (122). The data reduction processing system 16 combines the reduced SC data from each volume (122). The data reduction processing system 16 determines if the reduced data meets the criteria (132). For example, the reduced SC data is compared with the original SC data to determine if the reduced SC data meets a set of comparison metrics as described in FIG. 2. If the reduced data meets the criteria, the data reduction processing system 16 increases the volume size (134) and starts another aggregation reduction cycle (112). If the reduced SC data does not meet the criteria, the data reduction processing system 16 uses the reduced SC data prior to the last reduction (136).

Figure 3B:
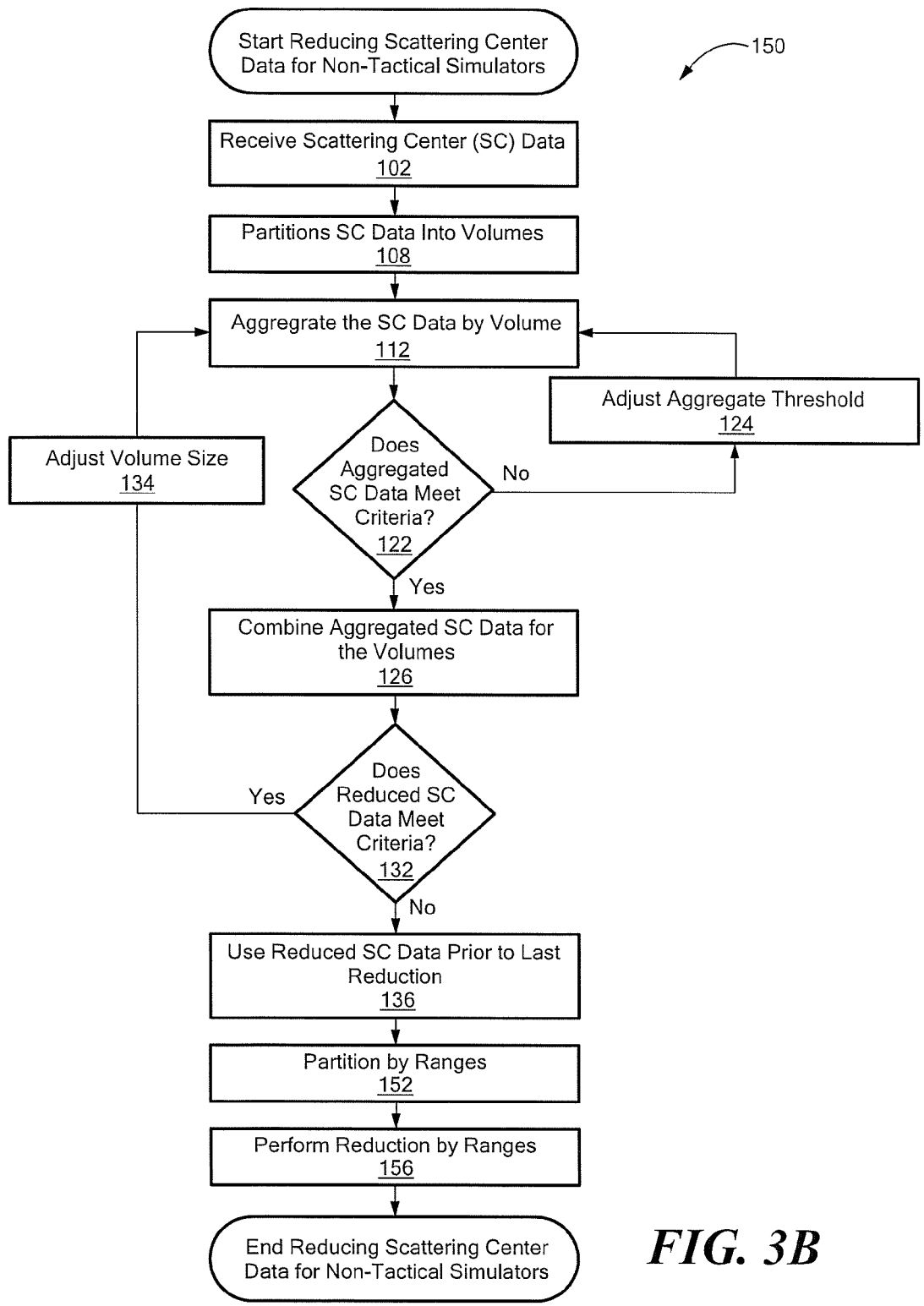

Referring to FIG. 3B, in one example, a process to further reduce SC data for use by the simulator 22 that is a tactical simulator is a process 150. The process 150 includes the processing blocks of process 100, for example, processing blocks 102-136. The data reduction processing system 16 partitions the SC data into ranges (152). For each range, the SC data for the object is reduced based on the magnitude of intensity (e.g., RCS value) of the SC data points (156). In one example, reduction may include reducing the SC data by a percentage using the RCS values of each data point. For example, for each SC type by range, the SC data points having the lowest 10 percent RCS value are eliminated.

Figure 4:
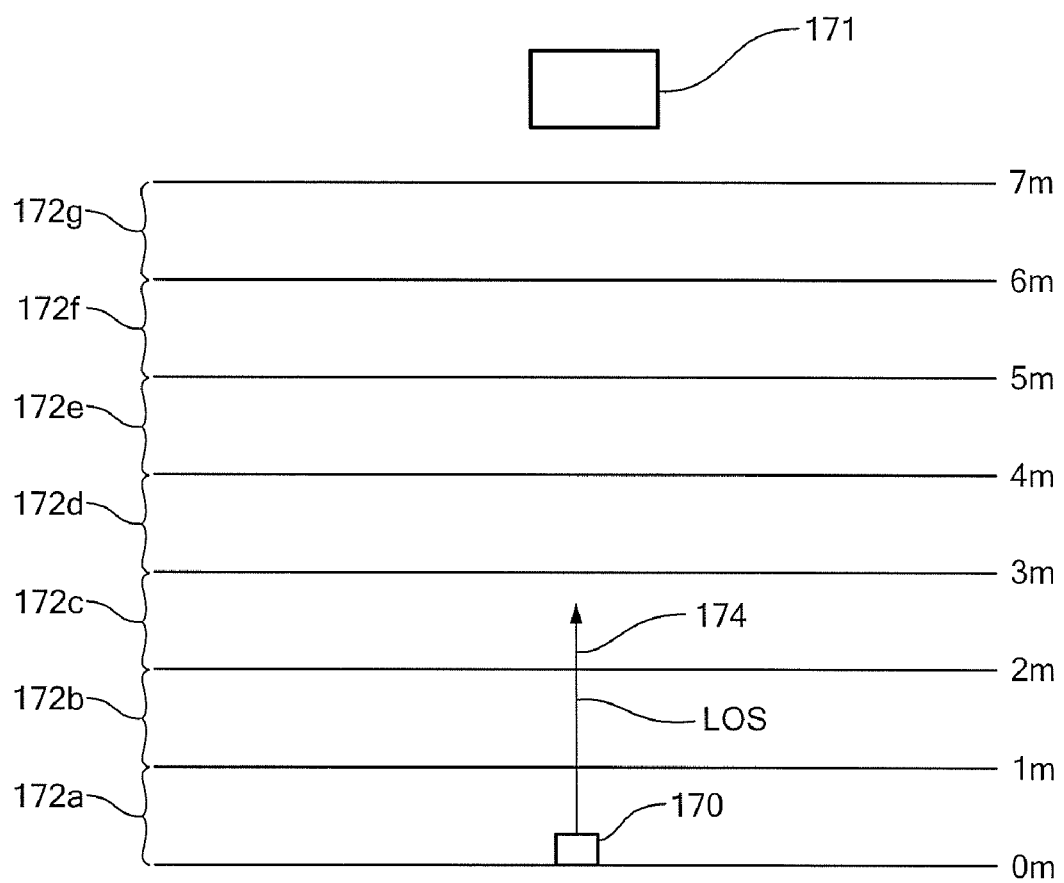
FIG. 4 is a graph depicting ranges.

Referring to FIG. 4, ranges 172a-172g are perpendicular to a line of site (LOS) axis 174 directed from a radar 170 to an object 171. In one example, the range 172a is from zero to 1 meter, the range 172b is from 1 meter to 2 meters, range 172c is from 2 meters to 3 meters and so forth.

Figure 5A:
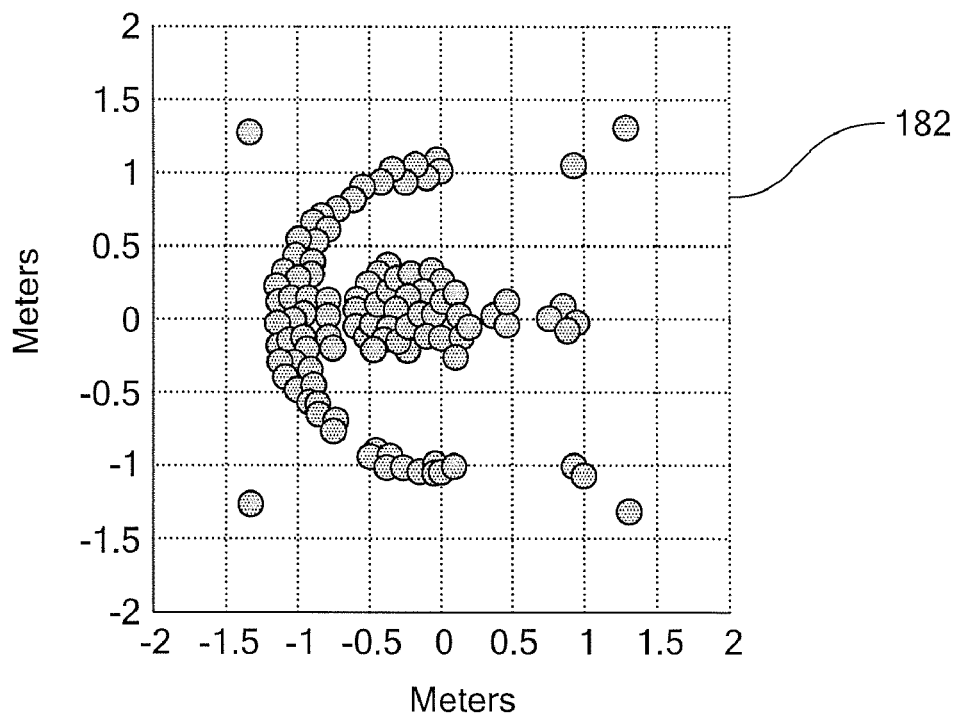
FIGS. 5A and 5B are graphs depicting the original SC Data and the reduced SC data.
Figure 5B:
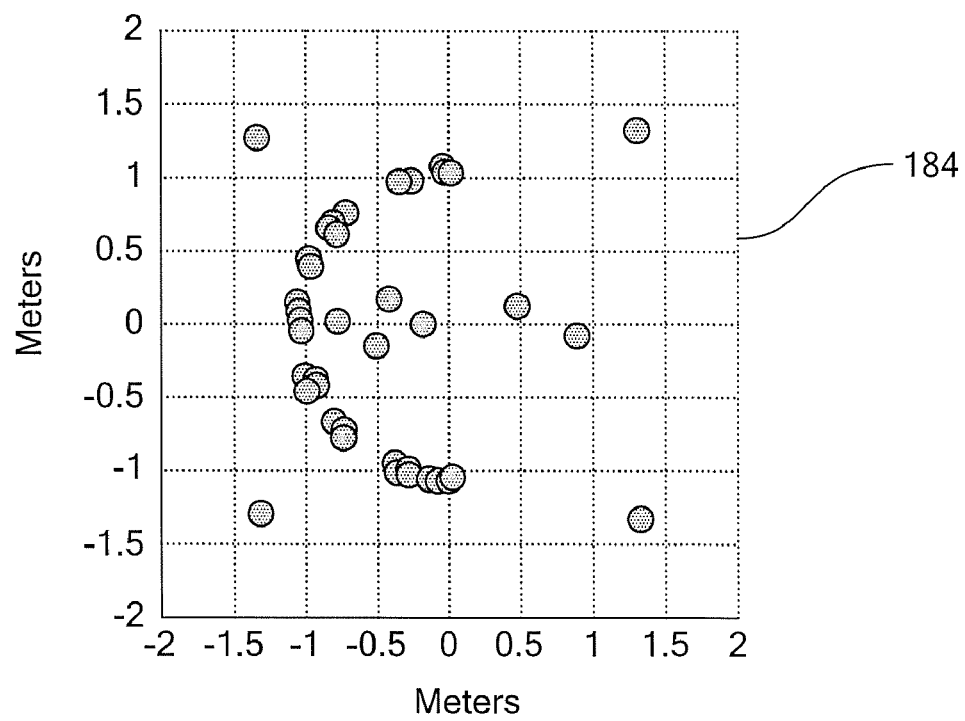

Referring to FIGS. 5A and 5B, using the process 150, for example, an original SC data set 182 for a missile may be reduced from 640 SC data points to a reduced data set 184 of 74 SC data points. FIGS. 5A and 5B each represent SC data points in 3-D but for simplicity only two dimension are shown.

Figure 6:
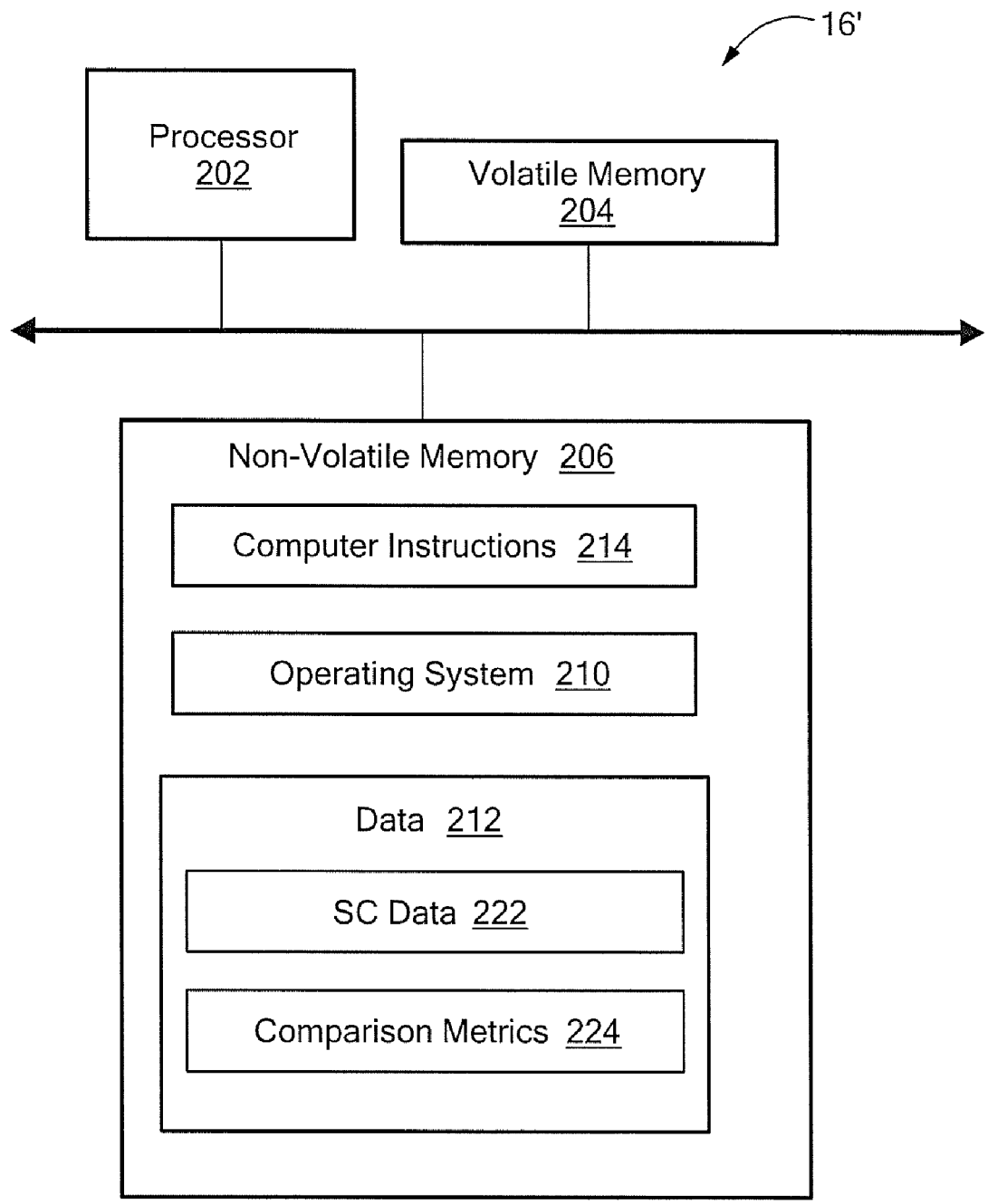
FIG. 6 is a block diagram of an example of a computer on which the processes of FIGS. 3A and 3B may be implemented.

Referring to FIG. 6, data reduction processing system 16 may be configured as a data reduction processing system 16', for example. The data reduction processing system 16' includes a processor 202, a volatile memory 204 and a non-volatile memory 206 (e.g., hard disk). The non-volatile memory 226 stores computer instructions 214, an operating system 210 and data 212 including SC data 222 and comparison metrics 224. In one example, the computer instructions 214 are executed by the processor 202 out of volatile memory 204 to perform all or part of the process 100 or the process 150.

Processes 100 and 150 are not limited to use with the hardware and software of FIG. 6; it may find applicability in any computing or processing environment and with any type of machine or set of machines that is capable of running a computer program. Processes 100 and 150 may be implemented in hardware, software, or a combination of the two. Processes 100 and 150 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 100 and 150 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 100 and 150. Processes 100 and 150 may also be implemented as a machine-readable storage medium, configured with a computer program, where upon execution, instructions in the computer program cause the computer to operate in accordance with process 100.

The processes described herein are not limited to the specific embodiments described. For example, the processes 100 and 150 are not limited to the specific processing order of FIGS. 3A and 3B, respectively. Rather, any of the processing blocks of FIGS. 3A and 3B may be re-ordered, combined or removed, performed in parallel or in serial, as necessary, to achieve the results set forth above.

The processing blocks in FIGS. 3A and 3B associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to reduce scattering centers (SC) comprising:
   receiving a set of SC data points associated with an object in three-dimensional space; using a computer processor for:
      partitioning the SC data points into a plurality of volumes;
      aggregating the SC data points within each volume based on an aggregate threshold;
      combining the aggregated SC data points associated with each volume to form a reduced set of SC data points;
      comparing the reduced set of SC data points with the received set of SC data points to determine if the reduced set of SC data points meets a set of comparison metrics; and
      if the reduced set of SC data points meets the set of comparison metrics, increasing the size of the volumes and performing another iteration of reducing the SC data points by volume.

2. The method of claim 1, further comprising, for each volume:
   determine if the aggregated SC data points for a volume conforms to a second set of metrics; and
   if the aggregated SC data points for a volume does not conform to the second set of metrics, increase the aggregate threshold.

3. The method of claim 2 wherein determining if the reduced set of SC data points for each volume conforms to a second set of metrics comprises determining if the reduced set of SC data points for each volume conforms to a second set of metrics comprising:
   a similarity metric;
   a maximum amplitude metric; and
   a length metric.

4. The method of claim 1 wherein comparing the reduced set of SC data points with the received set of SC data points based on a set of comparison metrics comprises comparing the reduced set of SC data points with the received set of SC data points based on a set of comparison metrics comprising:
   a similarity metric;
   a maximum amplitude metric;
   a length metric; and
   a relative maximum amplitude metric.

5. The method of claim 1 wherein receiving a set of SC data points comprises receiving a set of SC data points from a radar signature modeling tool.

6. The method of claim 1, further comprising:
   partitioning the reduced SC data into ranges; and
   reducing the SC data by range based on the magnitude of intensity of the SC data points.

7. An article comprising a machine-readable medium that stores executable instructions to reduce scattering centers (SC), the instructions causing a machine to:
   receive from a radar signature modeling tool a set of SC data points associated with an object in three-dimensional space;
   partition the SC data points into a plurality of volumes;
   aggregate the SC data points within each volume based on an aggregate threshold;
   combine the aggregated SC data points associated with each volume to form a reduced set of SC data points;
   compare the reduced set of SC data points with the received set of SC data points to determine if the reduced set of SC data points meets a set of comparison metrics; and
   if the reduced set of SC data points meets the set of comparison metrics, increase the size of the volumes and performing another iteration of reducing the SC data points by volume.

8. The article of claim 7, further comprising, for each volume, instructions causing a machine to:
   determine if the aggregated SC data points for a volume conforms to a second set of metrics; and
   if the aggregated SC data points for a volume does not conform to the second set of metrics, increase the aggregate threshold.

9. The article of claim 8 wherein the instructions causing a machine to determine if the reduced set of SC data points for each volume conforms to a second set of metrics comprises instructions causing a machine to determine if the reduced set of SC data points for each volume conforms to a second set of metrics comprising:
   a similarity metric;
   a maximum amplitude metric; and
   a length metric.

10. The article of claim 7 wherein the instructions causing a machine to compare the reduced set of SC data points with the received set of SC data points based on a set of comparison metrics comprises comparing the reduced set of SC data points with the received set of SC data points based on a set of comparison metrics comprising:
    a similarity metric;
    a maximum amplitude metric;
    a length metric; and
    a relative maximum amplitude metric.

11. The article of claim 7, further comprising instructions causing a machine to:
    partition the reduced SC data into ranges; and
    reduce the SC data by range based on the magnitude of intensity of the SC data points.

12. An apparatus comprising:
    circuitry to:
       receive a set of SC data points associated with an object in three-dimensional space;
       partition the SC data points into a plurality of volumes;
       aggregate the SC data points within each volume based on an aggregate threshold;
       combine the aggregated SC data points associated with each volume to form a reduced set of SC data points;
       compare the reduced set of SC data points with the received set of SC data points to determine if the reduced set of SC data points meets a set of comparison metrics; and
       if the reduced set of SC data points meets the set of comparison metrics, increase the size of the volumes and performing another iteration of reducing the SC data points by volume.

13. The apparatus of claim 12 wherein the circuitry comprises at least one of a processor, a memory, programmable logic and logic gates.

14. The apparatus of claim 12, further comprising, for each volume, circuitry to:
    determine if the aggregated SC data points for a volume conforms to a second set of metrics; and
    if the aggregated SC data points for a volume does not conform to the second set of metrics, increase the aggregate threshold.

15. The apparatus of claim 14 wherein the circuitry to determine if the reduced set of SC data points for each volume conforms to a second set of metrics comprises circuitry to determine if the reduced set of SC data points for each volume conforms to a second set of metrics comprising:
   a similarity metric;
   a maximum amplitude metric; and
   a length metric.

16. The apparatus of claim 12 wherein the circuitry to compare the reduced set of SC data points with the received set of SC data points based on a set of comparison metrics comprises circuitry to compare the reduced set of SC data points with the received set of SC data points based on a set of comparison metrics comprising:
   a similarity metric;
   a maximum amplitude metric;
   a length metric; and
   a relative maximum amplitude metric.

17. The apparatus of claim 12, further comprising circuitry to:
   partition the reduced SC data into ranges; and
   reduce the SC data by range based on the magnitude of intensity of the SC data points.

18. A method to reduce scattering centers (SC) comprising:
   receiving from a radar signature modeling tool a set of SC data points associated with an object in three-dimensional space;
   using a computer processor for:
      partitioning the SC data points into a plurality of volumes;
      aggregating the SC data points within each volume based on an aggregate tlreshold;
      combining the aggregated SC data points associated with each volume to form a reduced set of SC data points;
      comparing the reduced set of SC data points with the received set of SC data points to determine if the reduced set of SC data points meets a set of comparison metrics based on a set of comparison metrics comprising:
         a similarity metric;
         a maximum amplitude metric;
         a length metric; and
         a relative maximum amplitude metric; and
      if the reduced set of SC data points meets the set of comparison metrics, increasing the size of the volumes and performing another iteration of reducing the SC data points by volume.

19. The method of claim 18, further comprising, for each volume:
   determining if the aggregated SC data points for a volume conforms to a second set of metrics; and
   if the aggregated SC data points for a volume does not conform to the second set of metrics, increasing the aggregate threshold,
   wherein determining if the reduced set of SC data points for each volume conforms to a second set of metrics comprises determining if the reduced set of SC data points for each volume conforms to a second set of metrics comprising:
   a similarity metric;
   a maximum amplitude metric; and
   a length metric.

20. The method of claim 19, further comprising:
   partitioning the reduced SC data into ranges; and
   reducing the SC data by range based on the magnitude of intensity of the SC data points.

* * * * *

UNITED STATES PATENT AND TRADEMARK OFFICE
CERTIFICATE OF CORRECTION

PATENT NO. : 7,602,332 B1  Page 1 of 1
APPLICATION NO. : 12/138814
DATED : October 13, 2009
INVENTOR(S) : Lee et al.

It is certified that error appears in the above-identified patent and that said Letters Patent is hereby corrected as shown below:

Col. 1, line 6-7, delete "Government under Contract HQ0006-03-C-0047" and replace with -- Government support under Contract Number HQ0006-03-C-0047 --.

Col. 2, line 22, delete "of data points" and replace with -- of SC data points --.

Col. 2, line 38, delete "Data" and replace with -- data --.

Col. 3, line 19, delete "three-dimension" and replace with -- three-dimensional --.

Col. 3, line 25, delete "may used" and replace with -- may be used --.

Col. 3, line 67, delete "increases" and replace with -- increasing --.

Col. 5, line 33, delete "point" and replace with -- points --.

Col. 5, line 34, delete "SC points" and replace with -- SC data points --.

Col. 5, line 36, delete "conform" and replace with -- conforms --.

Col. 6, line 3, delete "dimension" and replace with -- dimensions --.

Signed and Sealed this

First Day of December, 2009

David J. Kappos
*Director of the United States Patent and Trademark Office*